Oct. 23, 1962 H. S. FEDER 3,060,267

SWITCHING CIRCUIT

Filed Oct. 23, 1958

INVENTOR
H. S. FEDER
BY R. C. Winter
ATTORNEY

United States Patent Office 3,060,267
Patented Oct. 23, 1962

3,060,267
SWITCHING CIRCUIT

Herbert S. Feder, Fanwood, N.J., assignor to Bell Telephone Laboratories, Incorporated, New York, N.Y., a corporation of New York Filed Oct. 23, 1958, Ser. No. 769,191
11 Claims. (Cl. 179—15)

This invention relates to electrical switching systems and more particularly to time division telephone switching systems including gating networks.

In the present day high speed information handling systems a practice employed in transferring information from one locality to another is time sharing, or time division multiplexing, which permits the simultaneous exchange of information between communicating pairs of a plurality of terminals over a common communication link. This practice requires that in successive short time intervals each pair of terminals in communication be assigned a frequently recurring discrete time slot during which information may be sampled and received. In the interval between appearances of the time slot assigned to a particular pair of terminals, the common communication link is available to other pairs of communicating terminals. By sampling at a sufficiently rapid rate, proper filtering in transmission and rapid transfer of the sampled information to and from the common communication link, an accurate reproduction of the information transmitted from one terminal of the pair may be formed at the other terminal of the pair.

This technique may be utilized, for example, in telephone systems where a plurality of subscriber stations may be interconnected via a common communication link, thereby conserving expensive transmission facilities. A system of this type is described by D. B. James, J. D. Johannesen, M. Karnaugh and W. A. Malthaner, in Patent 2,957,949, issued October 25, 1960.

Such a system requires the provision of a gating network having the characteristics of essential infinite impedance to current flow in either direction when in the non-conducting state, essentially zero impedance in both directions when in the conducting state, electronic operation to enable switching at high speeds, and isolation of the current transmission path from the gate control circuitry. A gate suitable for this purpose is disclosed in Patent 2,899,570 by J. D. Johannesen, P. B. Myers and J. E. Schwenker, issued August 11, 1959. In this instance a two-transistor transmission gate is indicated, with a control signal applied between the base and emitter of each transistor.

The attenuation of gate control signals, and more particularly, their isolation from the subscriber lines to maintain the lines free from spurious noise otherwise introduced by such gate control signals, is a prime consideration in the choice of such a two-transistor gate for time division communication system applications. It is apparent, however, that the adoption of single transistor gates for this purpose would present considerable advantage from an economic standpoint, provided some means could be found to eliminate gate control signals from the subscriber lines which normally would arise from the use of single transistor gates in such applications.

It is a general object of this invention to provide an improved signal transmission system.

More specifically, it is an object of this invention to provide an improved time division communication system capable of transmitting information between a plurality of pairs of communicating terminals over a common communication link.

It is a further object of this invention to provide such a system with a simplified gating circuit between the terminals and common link.

It is, therefore, another object of this invention to provide a more economical time division switching system.

These and other objects of this invention are attained in one specific illustrative embodiment wherein a time division communication system of the type described in the aforementioned James et al. patent comprises, in accordance with this invention, a plurality of single transistor gates connected between corresponding telephone subscriber lines and a common communication link. Each subscriber line comprises a repeat coil connected to the terminal and a filter connected between the repeat coil and the line gate.

A storage capacitance terminates the filter and has a resonant transfer inductance connected from one side thereof in the path including the line gate to form a resonant transfer circuit, as described in detail in Patent 2,936,337 by W. D. Lewis, issued May 10, 1960. The opposite side of the storage capacitance in each line is connected to a common circuit means which, in turn, is connected to ground.

A selected line gate is activated to allow passage of signals therethrough by applying a drive pulse to the base of the single transistor comprising the line gate. In this fashion the base material of the transistor is flooded with minority carriers and the transistor junctions are reduced to their low impedance states. An information signal appearing on the storage capacitance in the associated line circuit is then free to pass through the line gate to the common communicaton link. Such means alone fail to isolate the line gate drive pulse from the line circuit where it may contaminate the signal samples deposited in the line storage capacitance.

In accordance with one aspect of this invention, the common circuit means to which each line circuit is connected comprises a common gate which, in turn, is connected to ground. The common gate is disabled during the period that the selected line gate is enabled, thereby isolating the line circuits from ground during the interval of line gate operation, so that the control pulse cannot find a return path through the line circuit. However, the common communication link is grounded through a resistor, such that the control pulse operating the selected line gate will find a return path via the common link, thereby affording complete isolation of the control signals from the line circuits. The single common gate is enabled during the interval between enablement of the line gates, thus establishing the desired unbalanced transmission circuit termination at each line. Generally this common gate will be enabled for a shorter interval than that occupied in transfer of information through the line gates.

In accordance with another aspect of this invention, the common gate advantageously may comprise a passive network including a plurality of series-connected diodes having an inductance shunted across each of the diodes.

The unique combination of common gate or passive network connected in common between each line circuit and ground, permits the reduction of elements required in the line gates of a time division communication system to a single transistor by attenuating the line gate control voltage otherwise appearing in the line circuits.

It is a feature of this invention that each line circuit in a time division communication system comprise a single transistor line gate connected to a storage capacitance terminating a line filter and means connected in common between the line filter and ground for selectively connecting the line circuit to ground.

It is a feature of one embodiment of this invention that the line circuits be connected in common to ground through a transistor gate.

It is another feature, in accordance with this embodiment of the invention, that the common gate be enabled to connect each line circuit to ground during intervals in which each line gate is disabled and that the common gate be disabled to remove ground from the line circuits during intervals in which any one of the line gates is enabled.

It is a feature, in accordance with another embodiment of this invention, that a passive network comprising unidirectional current transmission devices connected in series with inductance means shunted across each of the diodes be connected between a common connection to the line circuits and ground.

It is a further feature of this invention that resistance means be connected between ground and a communication link, which in turn is connected in common to each of the line gates, so as to provide a gate control signal path.

A complete understanding of these and other features of this invention may be gained from consideration of the following detailed description, together with the accompanying drawing, in which.

Figure 1:
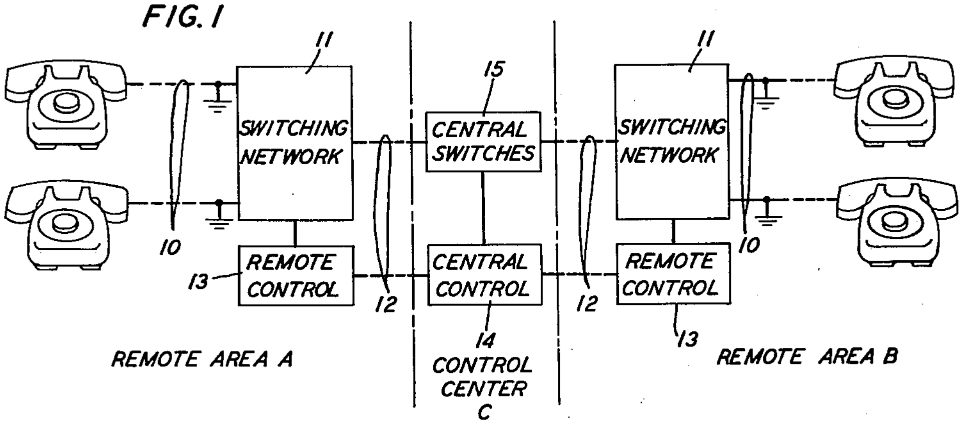
FIG. 1 is a schematic representation in block form of a telephone system in which a gating arrangement in accordance with this invention may be employed.

Turning now to the drawing, the basic elements of a time division telephone exchange in which this invention may be incorporated are depicted in FIG. 1. This system is disclosed in the aforementioned James et al. patent. As shown therein, a plurality of subscriber lines 10 are selectively connected by a switching network 11 in remote areas A and B to a switching and control center C over common transmission and control links 12. Equipment in central control 14 then is operated, for example, in accordance with signals from a subscriber line 10 in remote area A to complete a connection through the central switches 15 to a called subscriber's line 10 in the same remote area A, in remote area B, or over trunks to other remote areas and foreign telephone systems.

Advantageously, the system is operated on a time division multiplex basis in which each subscriber line 10 desiring service is assigned a particular sampling period or time slot in a recurrent cycle of time slots. Upon each occurrence of a time slot assigned to a particular calling subscriber's line 10, a sample of information is transmitted from his telephone through the switching network 11 to the common transmission link 12 and through the same or a similar switching network 11 to the called subscriber's line 10. Considering that the called subscriber may be located in another remote area or a foreign telephone system, such signal samples are transmitted over the common link 12 to the central switches 15, from whence they are disseminated to the desired terminal point.

Information as to the condition of a subscriber line 10 and as to whether it is idle, busy on an established connection, or desiring to have a connection established to it, is obtained by the remote area control 13 connected between the remote switching network 11 and the central control 14 by a control lead of the common communication link 12. The remote area control contains a scanning circuit which detects particular conditions of the lines 10 during designated sampling periods and transmits control signals to line gating circuits in the switching network 11 upon receipt of directive signals from the central control 14. The resultant connections and disconnections of the line gating circuits in the switching network 11 occur rapidly and in a selected sequence for precisely timed intervals during which signal samples are transmitted between the subscriber lines 10 and the common communication link 12.

Figures 2, 3, 4:
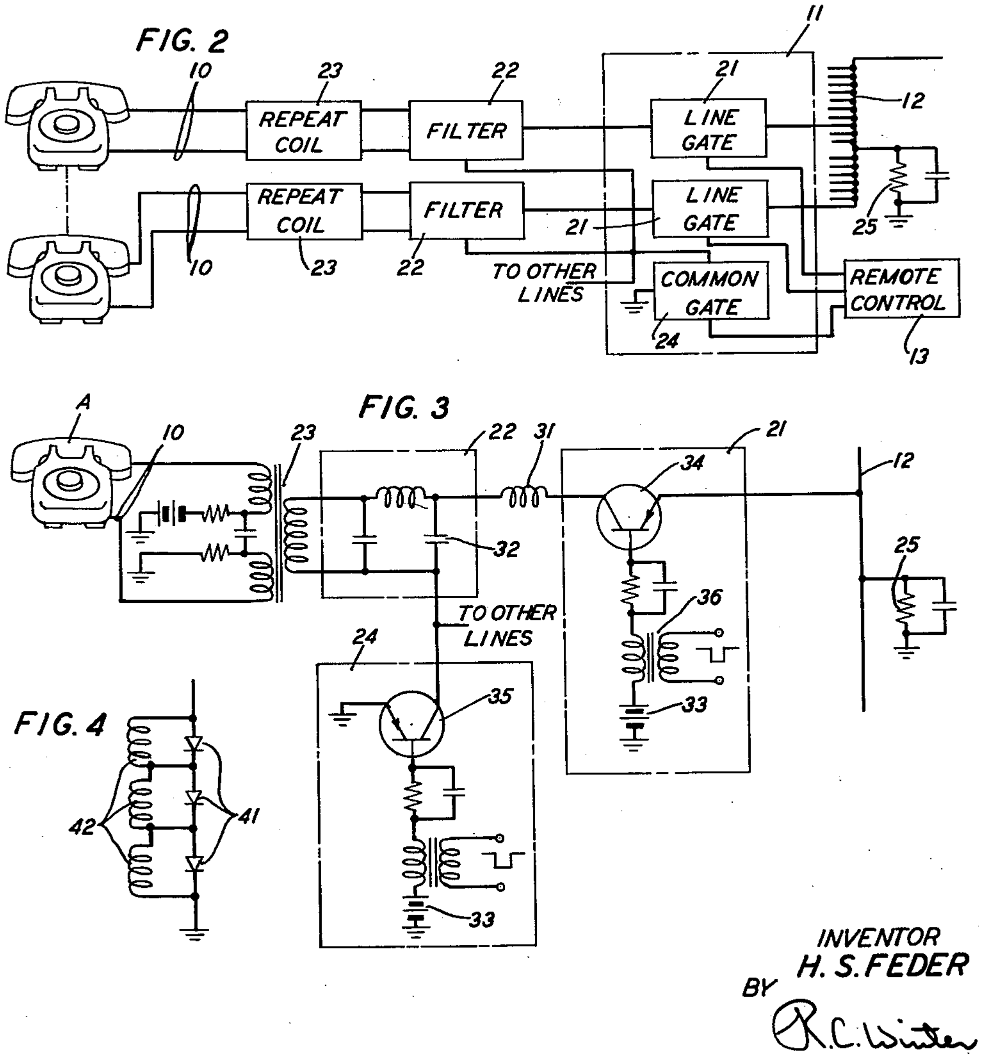
FIG. 2 is a schematic representation of a time division gating arrangement in accordance with this invention that may be employed in the telephone system of FIG. 1.
FIG. 3 is a detailed schematic representation of one embodiment of the arrangement of FIG. 2.
FIG. 4 is a schematic representation of another embodiment of the arrangement illustrated in FIG. 2.

As shown in FIG. 2, the switching networks 11 of the system of FIG. 1 comprise a line gate 21, corresponding to each line 10 and connected between a filter 22 in the line 10 and the common link 12.

In order to permit unbalanced operation, utilizing a ground return in the transmission line, each of the line circuits must be grounded. In accordance with this invention, this condition is satisfied by connection of each of the lines 10 in common to ground through common connecting means, such as the common gate 24 shown in FIG. 2. In addition, resistance means 25 is connected between the common communication link 12 and ground. The addition of the common gate 24 connected between ground and each of the lines 10 permits a simplification of the line gate requirements such that a single transistor may provide the selective, bilateral, transmission characteristics desired in the instant telephone system, since it obviates the need for a control signal return path in the line gate itself.

This advantage is best seen with reference to FIG. 3 which shows the novel line circuit arrangement in more detail. The low pass filter 22 shown therein, in each line circuit 10, may comprise well known low pass elements, primarily sections of series inductance and shunt capacitance, to produce the required cut-off characteristics for voice frequency transmission. A resonant transfer inductance 31, shown connected between the filter 22 and line gate 21, permits lossless transfer of the information stored in the shunt capacitance 32, terminating the low pass filter 22, through the line gate 21 to the common communication link 12. The shunt capacitance 32, normally connected to ground for the desired unbalanced circuit operation, is connected instead in accordance with this invention, to the common gate 24 which, in turn, is connected to ground.

Each of the line gates 21 and the gate 24, common to all of the lines 10, advantageously may comprise a single transistor having a control signal applied to its base electrode The collector electrode in the transistor of each of the line gates 21 is connected to an individual subscriber line 10 and the emitter electrode, in turn, is connected to the common communication link 12. The common gate 24 has its collector electrode connected to one side of the storage capacitance 32 in each of the subscriber lines 10 and its emitter electrode connected to ground. Advantageously, a bias indicated by battery 33 is applied to the base electrode of each of the gates 21 and 24 to establish a suitable operating condition.

Signals emanating from a central control point, indicated as central control 14 in the system of FIG. 1, establish properly timed application of control pulses from pulse generating circuits in remote control 13 to the base of each of the line gates 21 and the common gate 24 through transformer couplings. The gate control is programed such that a control pulse is applied to a single line gate 21, selected in accordance with the system requirements, for transmission of information to and from the associated subsciber line, and in a succeeding time interval, a control pulse is applied to the common gate 24. Thus the system is operated in such a fashion that line gates 21 are operated in successive, spaced time intervals, with the common gate 24 operated in the intermediate intervals.

Considering, now, the operation of the circuit in accordance with this invention, with particular reference to FIG. 3, it is assumed that the Station A is in the process of communicating with a second station, not shown, the information transmitted between these stations being carried by the common communication link 12. The central control equipment has priorly assigned to the Station A a particular time slot in an office cycle or frame of time slots. During this time slot a sample of information stored on the associated storage capacitance 32 is transferred to the common link 12, and a sample on the common link 12 is transferred simultaneously to the storage capacitance 32. It should be noted that the resonant transfer operation discussed hereinbefore limits the transfer of information between capacitor 32 of subscriber A and capacitor 32 of the second subscriber since their associated line gates 21 are the only ones enabled during this particular time slot interval. No crosstalk problem can exist from the other subscriber capacitors connected in common to gate 24 at this interval, since their associated linegates 21 are open and thus no complete discharge circuit exists for the signals on these capacitors.

This operation is accomplished in the designated time slot in each frame by operation of the associated line gate 21 which comprises the single transistor 34 having its emitter-base and collector-base junctions normally back-biased, the former through the common link 12, resistor 25, and ground to bias source 33 and the latter through the secondary winding of the repeat coil 23, common gate 24, and ground to the bias source 33.

The line gate 21 is enabled by the application of a control pulse to the base electrode of the transistor 34. The control pulse, advantageously applied through an inductive coupling 36, is of sufficient magnitude to overcome the emitter and collector bias and break down the transistor junctions to their low impedance state, thereby permitting bilateral transmission between collector and emitter.

The control signal seeks a return path to the base ot transistor 34 through the line circuit 10 but finds this route blocked by the disabled common gate 24, which gate is included in the only available return path through the line circuit. The only alternative return path for the control signal is that through resistance 25 connected to the common communication link 12, and the entire control signal current thus follows this path.

Upon removal of the control signal, the line gate 21 is restored to its high impedance, nonconductive state. Simultaneously with such disablement of the line gate 21, an enabling pulse is applied to the base of the transistor 35 in the common gate circuit 24. The control signal in this instance serves to place the transistor 35 in its low impedance, conductive state, thereby connecting ground through the emitter collector path to the filter 22 to place the line circuit in the desired unbalanced operating state preparatory to the storage of a new information signal on the storage capacitance 32. Upon enablement of the next selected line gate 21, the common gate 24 is again disabled, thereby isolating the next selected line circuit from the effects of the control signal applied to the associated line gate.

The common gate 24, disclosed in connection with the circuit of FIG. 3 as a single transistor gating arrangement identical to the line gates 21, may have substituted therefor, in accordance with a second embodiment of my invention, a passive network of the type shown in FIG. 4. Such a network comprises a plurality of series-connected unidirectional current devices 41, such as semiconductor diodes as shown. Each of the unidirectional current devices 41 is shunted by an inductance 42, and the entire assembly is connected between ground and each of the line circuits 10 in the manner shown for the common gate 24 in FIG. 3. Such an arrangement again provides the ground connection for each line circuit in the desired unbalanced arrangement, while presenting a high impedance to the passage of control pulses applied to the line gates 21, thus forcing the control signals to again follow the lower impedance ground return path through the common link 12. The inductance of the passive network presents the desired high impedance to the control pulses. The small portion of the signal which may succeed in passing through each inductance is shunted by the diode in parallel in each stage. I have found that three such stages provide optimum results. However, the adjacent channel crosstalk produced by this circuit in telephone system applications renders the circuit less desirable than the gating circuit described hereinbefore.

It is to be understood that the above-described arrangements are illustrative of the application of the principles of this invention. Numerous other arrangements may be devised by those skilled in the art without departing from the spirit and scope of this invention.

What is claimed is:

1. A time division communication system including a plurality of lines, a common communication link, first means operable for connecting each of said lines to said link, second means operable for connecting all of said lines in common to ground, means for applying control signals to said first connecting means to selectively enable and disable said first connecting means, and means for applying control signals to said second connecting means to enable and disable said second connecting means concurrently with the disabling and enabling, respectively, of said first connecting means.

2. A time division communication system comprising a plurality of input lines, a common communication link, first gating means for connecting each of said lines to said link, second gating means for connecting all of said lines in common to ground, and means for applying control signals to said first and second gating means to enable said first and second gating means alternately.

3. A time division communication system including a plurality of lines, a common communication link, first means comprising a bilateral transmission gating means connected between said common communication link and each of said lines, means for applying enabling pulses to said first means to transfer information from said lines to said link, second gating means commonly connected between said lines and ground for isolating said lines from ground during the application of said enabling pulses to said first means, and means connected to said common communication link for shunting said enabling pulses to ground whereby said lines are maintained free from said enabling pulses.

4. A time division communication system in accordance with claim 3 wherein said lines each comprise distinct storage means for storing information from such line, inductance means connecting said first means to one side of said storage means, the opposite side of said storage means being connected to said second gating means.

5. A time division communication system in accordance with claim 3 wherein said first gating means comprises a single transistor gate connected between each of said lines and said common link, each of said single transistors having its emitter and collector electrodes connected in the transmission path between the corresponding line and said common link and having said enabling pulses applied to its base electrode.

6. A time division communication system in accordance with claim 3 wherein said second gating means comprises a transistor gate, and further comprising means for applying enabling pulses to said second means to enable said second means alternatively with the enablement of said first means.

7. A time division communication system in accordance with claim 3 wherein said second gating means comprises a series of diodes each connected in parallel with inductance means.

8. A time division communication system in accordance with claim 3 wherein said means for shunting said enabling pulses to ground comprises resistance means connected between said common communication link and ground.

9. In a time division communication system, a plurality of lines each comprising a single transistor line gate, a common communication link connected to each of said line gates, means for selectively applying enabling pulses to said line gates in a first time interval to transfer information from said lines to said link, means connected to said link to complete a path to ground for said enabling pulses, and means for connecting each of said lines in common to ground in a second time interval to maintain said lines free from said enabling pulses.

10. A time division communication system in accordance with claim 9 wherein said means for connecting each of said lines in common to ground comprises a passive network including inductance means and unidirectional transmission means connected in parallel.

11. A time division communication system in accordance with claim 9 wherein said means for connecting each of said lines in common to ground comprises a single transistor bilateral transmission gate having an enabling pulse applied to the base electrode thereof when said line gates are not enabled.

References Cited in the file of this patent

UNITED STATES PATENTS

| | | |
|---|---|---|
| 2,659,774 | Barney | Nov. 17, 1953 |
| 2,662,123 | Koenig | Dec. 8, 1953 |
| 2,691,073 | Lowman | Oct. 5, 1954 |
| 2,851,617 | Walker | Sept. 9, 1958 |
| 2,870,259 | Norris | Jan. 20, 1959 |
| 2,936,338 | James | May 10, 1960 |